(12) United States Patent
Henricksen

(10) Patent No.: US 11,691,685 B2
(45) Date of Patent: Jul. 4, 2023

(54) ROAD BIKE STAND

(71) Applicant: Curtis A. Henricksen, Murieta, CA (US)

(72) Inventor: Curtis A. Henricksen, Murieta, CA (US)

( * ) Notice: Subject to any disclaimer, the term of this patent is extended or adjusted under 35 U.S.C. 154(b) by 0 days.

(21) Appl. No.: 17/123,647

(22) Filed: Dec. 16, 2020

(65) Prior Publication Data
US 2021/0179215 A1 Jun. 17, 2021

Related U.S. Application Data

(60) Provisional application No. 62/948,684, filed on Dec. 16, 2019.

(51) Int. Cl.
*B62H 3/08* (2006.01)
*E05B 71/00* (2006.01)

(52) U.S. Cl.
CPC .............. *B62H 3/08* (2013.01); *E05B 71/00* (2013.01)

(58) Field of Classification Search
CPC ... B62H 3/08; B62H 1/00; B62H 1/08; B62H 3/00; B62H 2003/005; B62H 3/04; B62H 3/10; B62H 2700/005; B62H 2700/00; F16M 11/22; E05B 71/00; B66F 5/00
USPC .......... 211/5, 17, 20, 22; 248/121, 127, 676; 254/133, 2 B, 6 B; 224/924, 413; D12/115, 120; 272/73
See application file for complete search history.

(56) References Cited

U.S. PATENT DOCUMENTS

| | | | | |
|---|---|---|---|---|
| 518,325 A * | 4/1894 | Mueller | .................. | B62H 3/04 211/22 |
| 529,827 A * | 11/1894 | Fonda | ...................... | B62H 3/00 211/22 |
| 562,520 A * | 6/1896 | Fonda | .................... | A63B 69/16 482/61 |
| 591,969 A * | 10/1897 | Hiekisch | ................. | B62H 3/00 211/22 |
| 593,521 A * | 11/1897 | Fowler | ..................... | B62H 3/10 211/22 |
| 635,435 A * | 10/1899 | Fowler | ..................... | B62H 3/10 211/22 |
| 1,042,877 A * | 10/1912 | Blair et al. | ............... | B62H 1/00 280/302 |
| 1,060,649 A * | 5/1913 | Tobin | ...................... | B62H 1/00 280/297 |
| 1,172,465 A * | 2/1916 | Knapp | .................... | B62H 1/00 280/302 |
| 1,621,120 A * | 3/1927 | Lee | ......................... | A63B 69/16 482/61 |
| 1,792,612 A * | 2/1931 | Staley | ................. | B25H 1/0007 269/55 |

(Continued)

*Primary Examiner* — Jennifer E. Novosad
(74) *Attorney, Agent, or Firm* — Stetina Brunda Garred & Brucker

(57) ABSTRACT

A support stand for supporting a bicycle includes a base, and a pair of lateral support members extending upwardly from the base in opposed relation to each other to define a wheel receiving channel therebetween. The wheel receiving channel extends along a channel axis. A pair of flanges extend from respective ones of the pair of lateral support members, with the pair of flanges being arranged so as to be engageable with respective opposed portions of the bicycle frame to support the bicycle frame with the rear wheel off the ground.

18 Claims, 8 Drawing Sheets

(56) References Cited

U.S. PATENT DOCUMENTS

| | | | | |
|---|---|---|---|---|
| 1,964,119 A * | 6/1934 | Hendry | B66F 5/00 | 414/427 |
| D150,753 S * | 8/1948 | Carr | D8/71 | |
| 2,524,955 A * | 10/1950 | Borzell | F16M 11/22 | 248/352 |
| 2,591,669 A * | 4/1952 | Bucknell | A45D 20/12 | 392/383 |
| 2,803,349 A * | 8/1957 | Talbot | B62H 3/10 | 211/22 |
| 2,962,262 A * | 11/1960 | Garver | B66F 5/00 | 254/134 |
| 3,036,828 A * | 5/1962 | Van Fleet | D06F 45/00 | 269/296 |
| 3,107,915 A * | 10/1963 | Looney | A63B 69/16 | 482/61 |
| 3,339,920 A * | 9/1967 | Moritz | A63B 9/00 | 482/34 |
| 3,658,360 A * | 4/1972 | Wood | B62H 1/02 | 280/302 |
| 3,724,844 A * | 4/1973 | Olmstead | A63B 69/16 | 482/61 |
| 3,865,245 A * | 2/1975 | Lieb | B62H 3/10 | 211/5 |
| 3,891,177 A * | 6/1975 | Jerrel | B25H 1/0007 | 248/352 |
| 4,262,899 A * | 4/1981 | Alvarez | A63B 21/0125 | 211/22 |
| 4,420,164 A * | 12/1983 | Mitchell | B62H 3/00 | 248/352 |
| 4,421,308 A * | 12/1983 | Nagy | A63B 69/16 | 211/22 |
| 4,596,386 A * | 6/1986 | Sackl | A63B 21/0125 | 482/61 |
| 4,629,104 A * | 12/1986 | Jacquet | B60R 9/10 | 211/17 |
| 4,733,810 A * | 3/1988 | Graber | B60R 9/10 | 16/374 |
| 4,856,659 A * | 8/1989 | Krebs | A47F 7/04 | 211/24 |
| 4,932,628 A * | 6/1990 | Pacheco | B25H 1/0007 | 248/129 |
| 4,955,600 A * | 9/1990 | Hoffenberg | A63B 21/015 | 434/61 |
| 5,026,047 A * | 6/1991 | Kosecoff | A63B 69/16 | 434/61 |
| 5,042,795 A * | 8/1991 | Bursik | A63B 69/16 | 482/61 |
| 5,121,862 A * | 6/1992 | Schmidt | B60R 9/06 | 211/17 |
| 5,301,817 A * | 4/1994 | Merritt | A47F 7/04 | 211/20 |
| 5,395,202 A * | 3/1995 | Peters | B66F 5/00 | 254/45 |
| 5,417,629 A * | 5/1995 | Phipps | B62H 1/04 | 211/22 |
| 5,562,271 A * | 10/1996 | Davis, Jr. | B25H 1/0007 | 248/675 |
| D375,472 S * | 11/1996 | Slater | D12/120 | |
| 5,735,410 A * | 4/1998 | Kallstrom | B60R 9/10 | 211/20 |
| 5,988,402 A * | 11/1999 | Mayfield | B62H 3/04 | 211/20 |
| 5,988,403 A * | 11/1999 | Robideau | A47F 7/00 | 211/17 |
| 6,003,830 A * | 12/1999 | Egan | G01M 15/02 | 248/129 |
| 6,193,078 B1 * | 2/2001 | Stuhlmacher | B25H 1/0014 | 211/20 |
| 6,364,277 B1 * | 4/2002 | Miller | B23Q 3/1546 | 248/676 |
| 6,488,157 B2 * | 12/2002 | Chen | B62H 3/00 | 211/20 |
| 6,620,081 B2 * | 9/2003 | Phillips | A63B 21/015 | 482/57 |
| 6,805,327 B1 * | 10/2004 | Shen | A47B 91/02 | 248/346.07 |
| 6,866,282 B2 * | 3/2005 | Heerspink | B62H 3/08 | 211/20 |
| 6,868,976 B1 * | 3/2005 | Lassanske | B62H 3/08 | 211/21 |
| 7,150,359 B1 * | 12/2006 | Lyons | B62H 3/08 | 211/20 |
| 7,320,460 B1 * | 1/2008 | Hastrich | B25H 1/0007 | 254/133 R |
| 7,648,317 B2 * | 1/2010 | Kobacker, II | B62H 3/04 | 410/3 |
| 7,686,549 B1 * | 3/2010 | Posey | B60P 3/073 | 410/3 |
| 7,694,921 B1 * | 4/2010 | Williams | F16M 11/22 | 248/127 |
| 8,485,369 B2 * | 7/2013 | Glover | B62H 3/04 | 211/24 |
| 9,610,993 B1 * | 4/2017 | Ho | B62H 3/06 | |
| 2002/0117459 A1 * | 8/2002 | Chen | B66F 3/005 | 211/20 |
| 2003/0160423 A1 * | 8/2003 | Heerspink | B62H 3/08 | 280/293 |
| 2004/0182974 A1 * | 9/2004 | Welland | B05B 15/62 | 248/146 |
| 2005/0284826 A1 * | 12/2005 | Johnson | B60S 13/00 | 211/20 |
| 2007/0138111 A1 * | 6/2007 | Schairer | B62H 3/10 | 211/17 |
| 2008/0174088 A1 * | 7/2008 | Kobacker | B62H 3/04 | 280/293 |
| 2008/0199271 A1 * | 8/2008 | Burry | B60P 3/073 | 410/3 |
| 2009/0250564 A1 * | 10/2009 | Glover | B60P 3/073 | 248/125.3 |
| 2010/0122958 A1 * | 5/2010 | Tsai | B62H 3/04 | 211/22 |
| 2014/0306084 A1 * | 10/2014 | Klinzmann | F16M 11/046 | 248/423 |
| 2015/0001371 A1 * | 1/2015 | Jeon | G01M 15/02 | 248/676 |
| 2020/0047833 A1 * | 2/2020 | Drew | B62K 3/14 | |
| 2021/0046859 A1 * | 2/2021 | Wurm | B60R 9/06 | |
| 2021/0171142 A1 * | 6/2021 | Caratiola | F16B 2/12 | |
| 2021/0179215 A1 * | 6/2021 | Henricksen | B62H 3/10 | |
| 2021/0179216 A1 * | 6/2021 | Henricksen | B62H 3/10 | |

* cited by examiner

ROAD BIKE STAND

CROSS-REFERENCE TO RELATED APPLICATIONS

This application claims the benefit of U.S. Application Ser. No. 62/948,684, filed Dec. 16, 2019, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a support stand for a bicycle, and more specifically to a support stand capable of supporting the bicycle with the rear wheel of the bicycle being elevated off the ground.

2. Description of the Related Art

Bicycles are widely used as a means of transportation, as well as for recreational purposes. When a bicycle is not being used, it is common to leave the bicycle in a generally upright position. Along these lines, some bicycle may include kickstands mounted directly to the bicycle frame, with the kickstand being pivotable relative to the frame between a stowed position and a deployed position. When in the deployed position, the kickstand may provide a structure on which the bicycle may lean against. During use of the bicycle, the kickstand may be transitioned to the stowed position so as not to drag on the ground.

While conventional kickstands allow bicycles to remain in a titled, upright position when not being ridden by a user, some bicycles do not include a kickstand. Furthermore, even if a bicycle is fitted with a kickstand, typically the kickstand is configured such that the bicycle is only supported on one side, and thus, the frame is slightly titled when supported by the kickstand, with both the front and rear wheel remaining on the ground. Accordingly, the kickstand may not be a suitable support structure if performing testing or maintenance on the vehicle which may require rotation of the rear wheel or the cranks.

Therefore, there is a need in the art for a support stand for a bicycle that can be used to support a bicycle with the rear wheel elevated off the ground. Various aspects of the present disclosure address this particular need, as will be described in more detail below.

BRIEF SUMMARY

According to one embodiment, there is provided a support stand for supporting a bicycle in a generally upright position, with the rear wheel being elevated off the ground and capable of freely rotating. The support stand may support the bicycle on opposite sides of the frame to provide a stable, sturdy support for the bicycle. The stand may be configured to support the bicycle in a manner which allows for unhindered movement of the cranks and rear wheel. As such, the stand may be particularly suitable for testing and maintenance of the bicycle.

According to one embodiment, the support stand includes a base, and a pair of lateral support members extending upwardly from the base in opposed relation to each other to define a wheel receiving channel therebetween. The wheel receiving channel extends along a channel axis. A pair of flanges extend from respective ones of the pair of lateral support members, with the pair of flanges being arranged so as to be engageable with respective opposed portions of the bicycle frame to support the bicycle frame with the rear wheel off the ground.

The pair of flanges may be arranged in non-parallel relation to each other.

According to another embodiment, there is provided a support stand for supporting a bicycle having a bicycle frame and a rear wheel. The support stand includes a base, and a pair of lateral support members coupled to the base. Each lateral support member defines a lateral channel therein. The pair of laterals supports extend upwardly from the base in opposed relation to each other to define a wheel receiving channel therebetween, with the wheel receiving channel extending along a channel axis. The support stand additionally includes a pair of support bodies configured to be received within a respective lateral channel. Each support body includes a main wall and a support flange extending from the support wall. The pair of flanges are arranged so as to be engageable with respective portions of the bicycle frame to support the bicycle frame with the rear wheel off the ground.

Each support body may include a locking member selectively engageable with a respective one of the pair of lateral support members to lock the support body relative to the respective one of the pair of lateral support members. Each lateral body may include a plurality of openings formed therein, with each opening being configured to receive the locking member when the corresponding support body is in a prescribed position.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
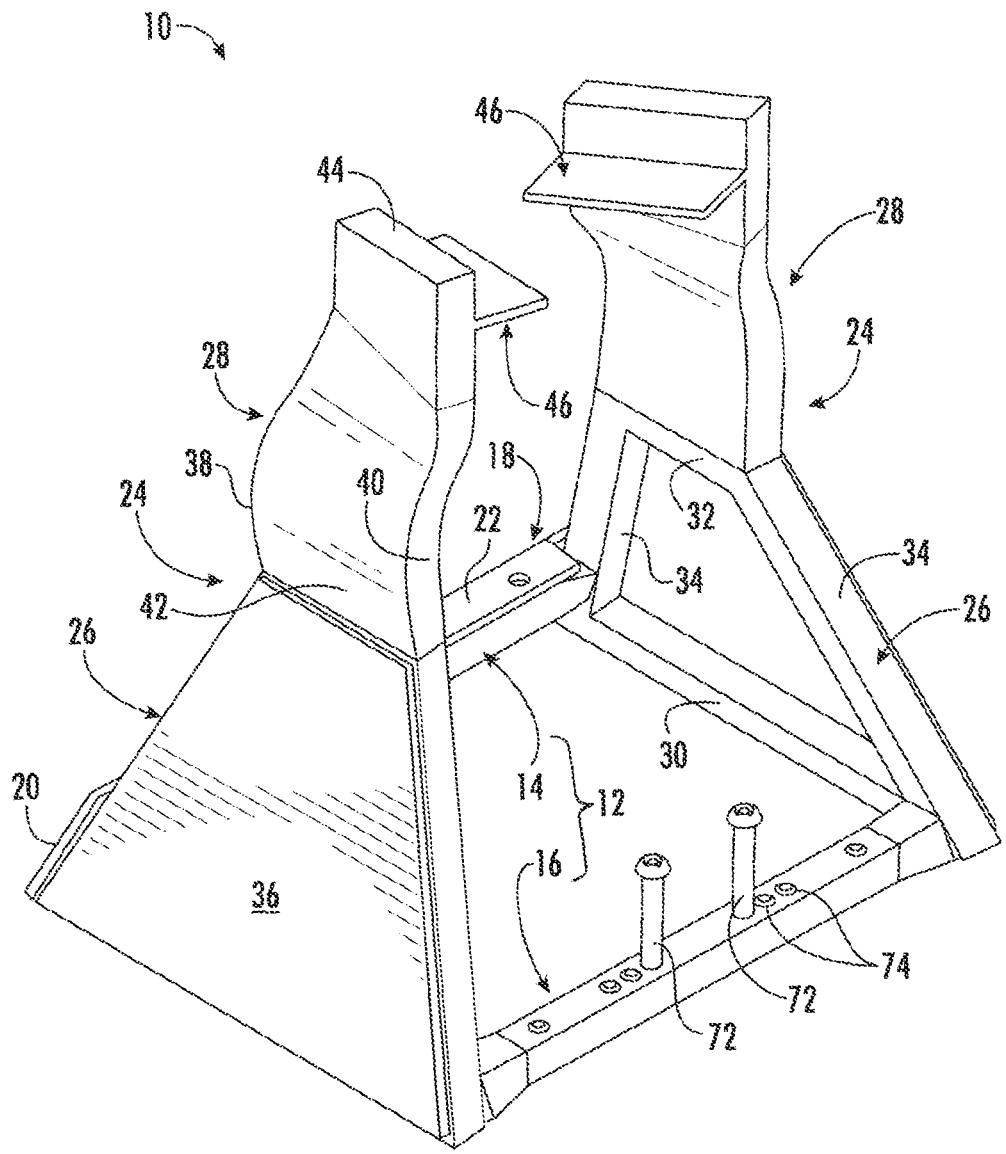
FIG. 1 is a rear, upper perspective view of a support stand in accordance with an embodiment of the present disclosure.
Figure 2:
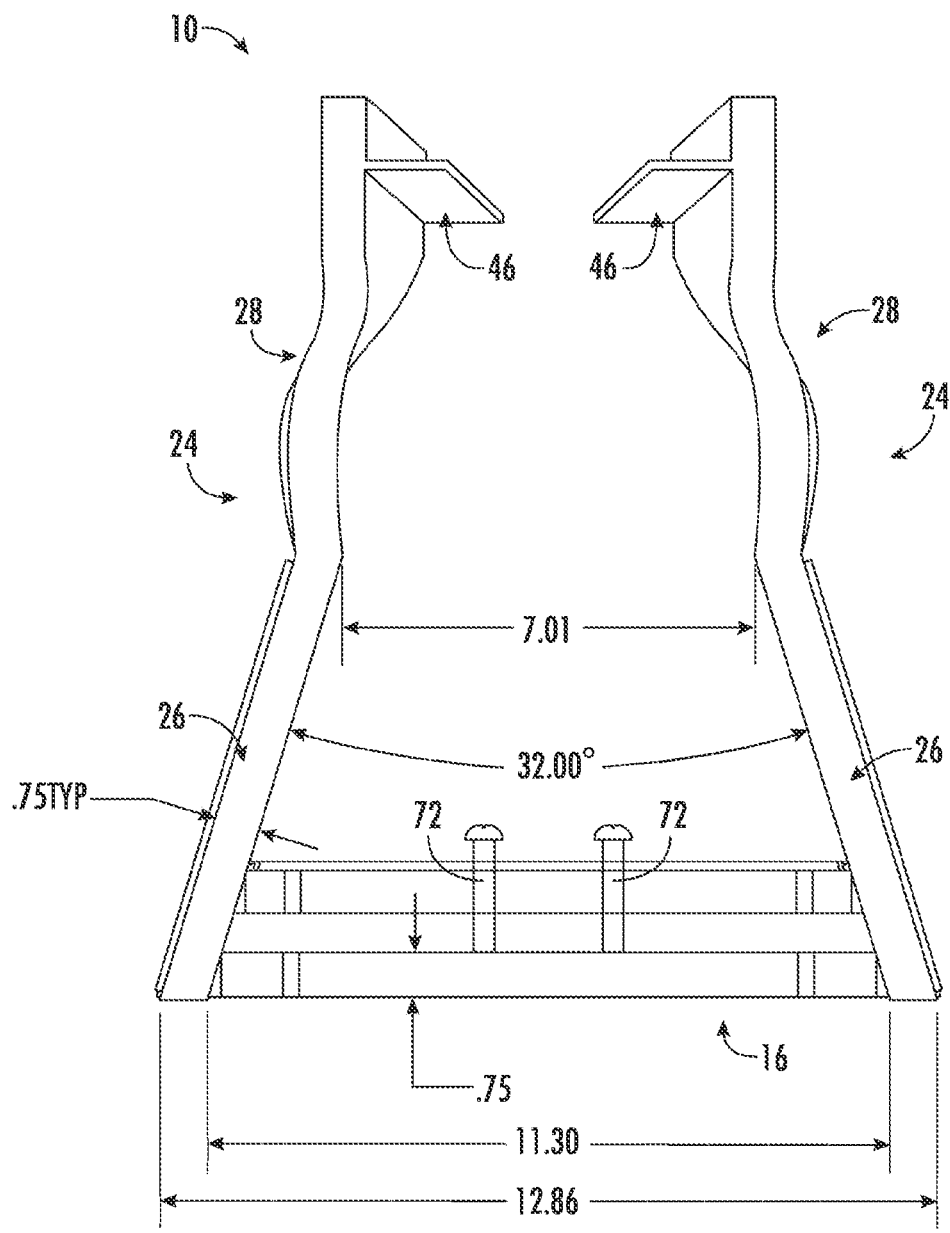
FIG. 2 is a rear view of the support stand depicted in FIG. 1.

Referring now to the drawings, wherein the showings are for purposes of illustrating a preferred embodiment of the present disclosure only, and are not for purposes of limiting the same, there is depicted a support stand 10 for supporting a bicycle such that the rear wheel of the bicycle is elevated off the ground. The support stand 10 may engage with portions of the bicycle frame on opposed sides of the rear wheel, e.g., the chain stays. When supported by the support stand 10, the bicycle may be in an upright position with the rear wheel elevated above the ground by a prescribed distance. The front wheel may remain in contact with ground and the cranks may rotate freely without making contact with the support stand 10. Thus, when the bicycle is supported by the stand, a user may conduct regular maintenance on the bicycle, such as maintaining the bicycle chain, sprockets, cranks, bearings or pedals. It is also contemplated that the ease-of-use associated with the support stand 10 may allow the support stand 10 to be used during periods of non-use (e.g., storage), or for also displaying the bicycle.

According to one embodiment, the support stand 10 comprises a base 12 including a front member 14 and a rear member 16. The front and rear members 14, 16 may be generally quadrangular rods that extend along the lower front and rear of the support stand 10. Each of the front and rear members 14, 16 may include a generally planar surface which may be placed on the ground or other underlying support surface. The front member 14 may be at least partially covered by a cover plate 18 having a forward face 20 and an upper face 22 angled relative to the forward face 20.

The support stand 10 additionally includes a pair of lateral support members 24 extending upwardly from the base 12 in opposed relation to each other. Each lateral support member 24 extends between the front and rear members 14, 16 and includes a generally trapezoidal lower body 26 and an upper body 28 extending upwardly from the lower body 26. The lower bodies 26 may be arranged such that they are angled inwardly toward each other to provide clearance for the cranks of the bicycle when the cranks are rotated while the bicycle is supported on the support stand 10. Each trapezoidal lower body 26 may include a trapezoidal frame including a large lower segment 30, a short upper segment 32 generally parallel to the lower segment 30, and a pair of side segments 34 extending between the upper and lower segments 32, 30. The side segments 34 are angled relative to each other, such that the distance between the side segments 34 is smaller at the upper segment 32 than at the lower segment 30. Each lower body 26 may additionally include a cover plate 36 extending over an outer surface of the trapezoidal frame. The cover plate 36 may be attached to the frame via screws, rivets, adhesives, welding, or other fasteners known in the art. It will be recognized that that segments 30, 32, 34 may be separate structures which are assembled and attached to each other through welds or other fastening modalities as needed to form respective ones of the lower bodies 26.

Each upper body 28 may include a front face 38, a rear face 40, a lower end portion 42, and an upper end portion 44. The support stand 10 may additionally include a pair of flanges 46, with each flange 46 being coupled to a respective upper body 28 and extending inwardly from the respective upper body 28. The flanges 46 are spaced from each other so as to allow a bicycle tire to extend therebetween when a bicycle is supported by the stand. The flanges 46 may be spaced from an upper, distal surface of the upper bodies 28, such that an uppermost segment of the upper bodies 28 extend upwardly beyond the flanges 46. These uppermost segments of the upper bodies 28 may provide lateral stability to the bicycle frame 52 when the bicycle frame 52 is supported by the flanges 46, as will be described in more detail below.

Figure 4:
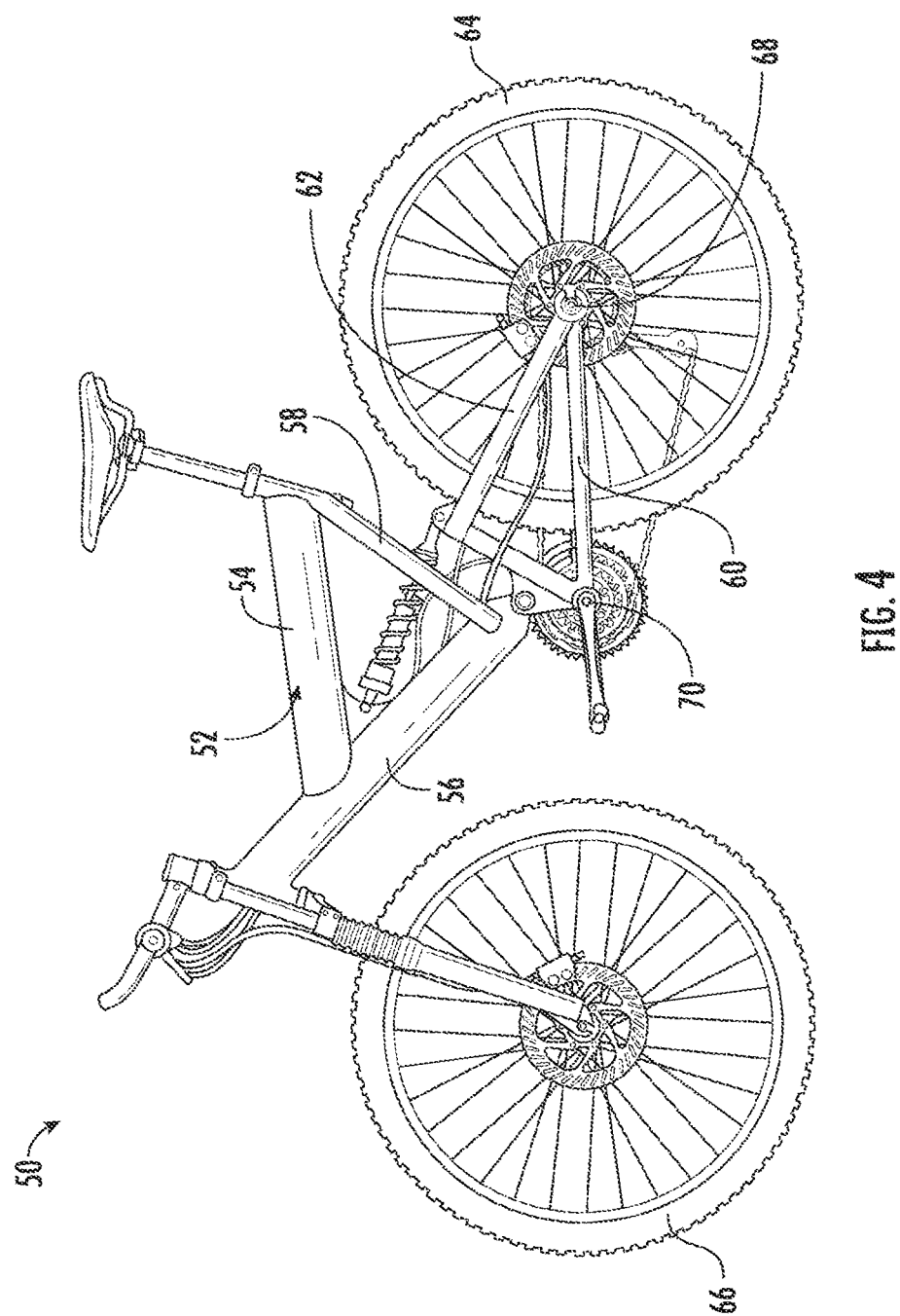
FIG. 4 is a side view of an exemplary bicycle which may be used with the support stand.
Figure 5:
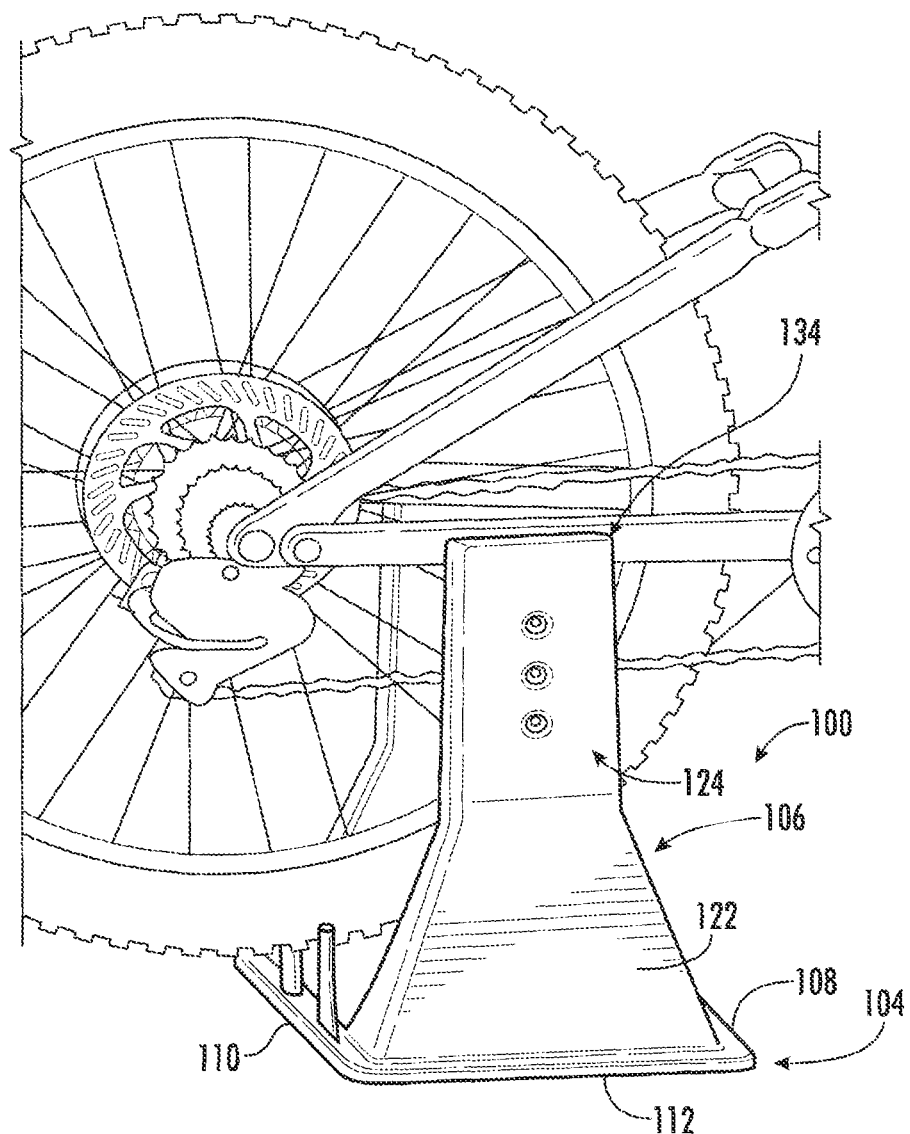
FIG. 5 is a rear, upper perspective view of a second embodiment of a support stand.
Figure 6:
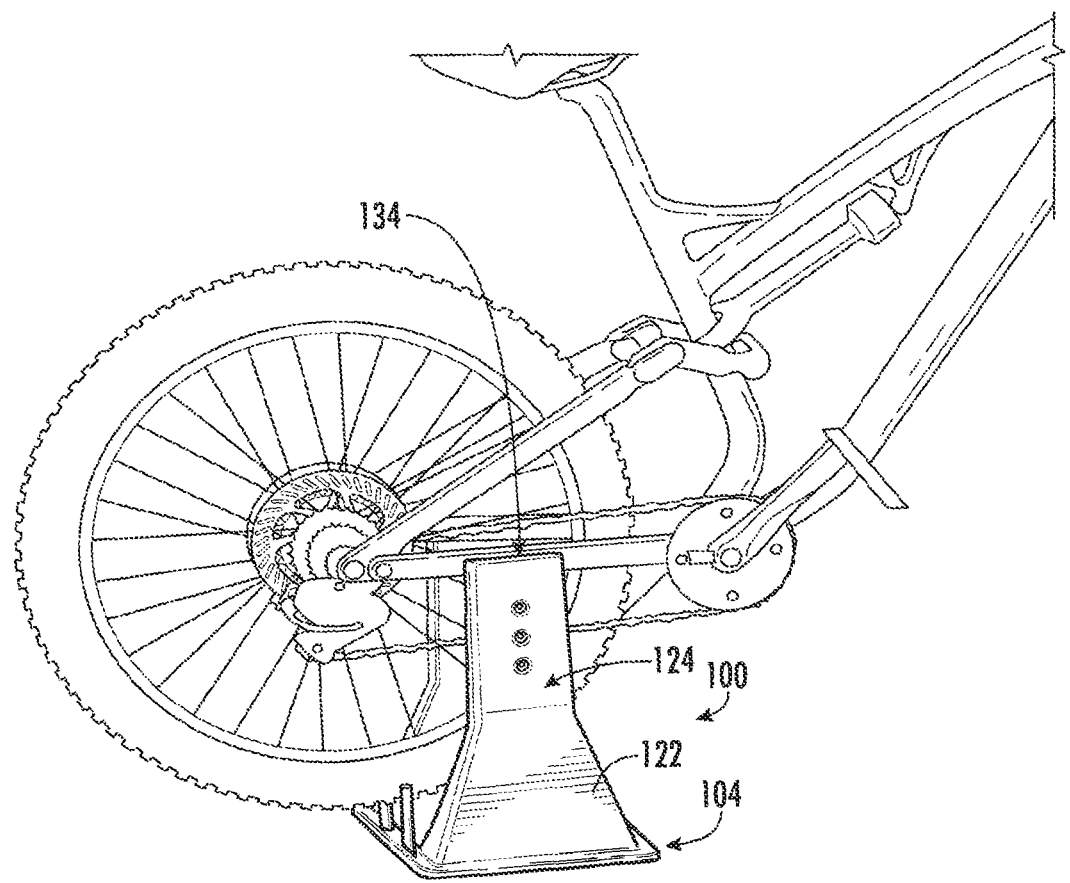
FIG. 6 is a further rear, upper perspective view of the support stand depicted in FIG. 5.
Figure 7:
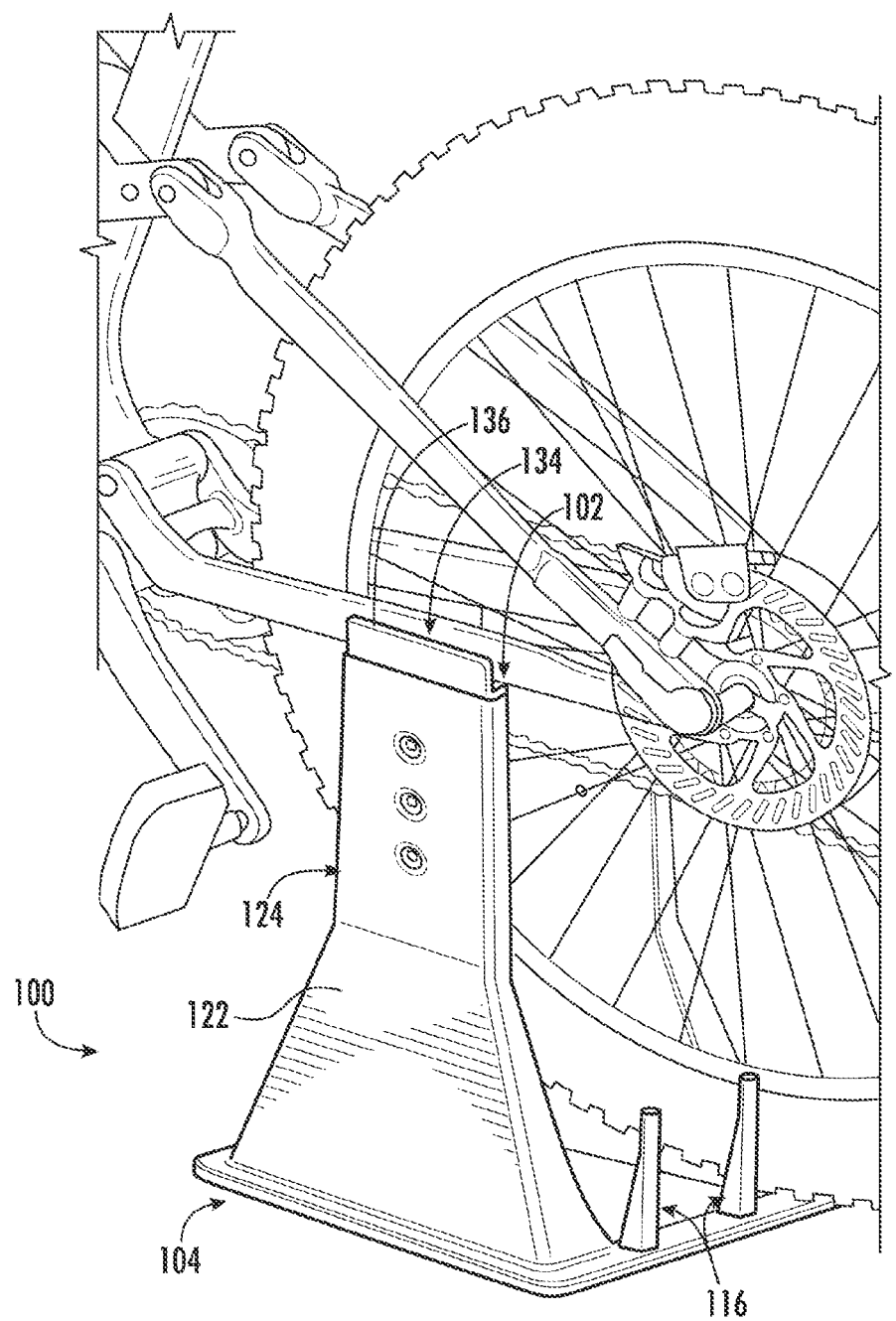
FIG. 7 is a rear, upper perspective view of the support stand depicted in FIG. 5, taken from a side opposite to that perspective depicted in FIG. 5.

The upper body 28 and the flanges 46 may be contoured and angled to more effectively engage with a bicycle. Along these lines, FIG. 4 shows an exemplary bicycle 50 which may be used with the support stand 10. The bicycle 50 includes a frame 52 including a top tube 54, a down tube 56, a seat tube 58, chain stays 60, and seat stays 62. The frame 52 is connectable to a rear wheel 64 and a front wheel 66. The aforementioned components of the frame 52 are included in most bicycles 50, including but not limited to mountain bicycles, road bicycles, beach cruisers, BMX bicycles, children's bicycles, push bicycles, scooter bicycles, electric bicycles, etc. In this regard, as used herein, the term bicycle 50 is used broadly to refer to any species of bicycle.

Figure 3:
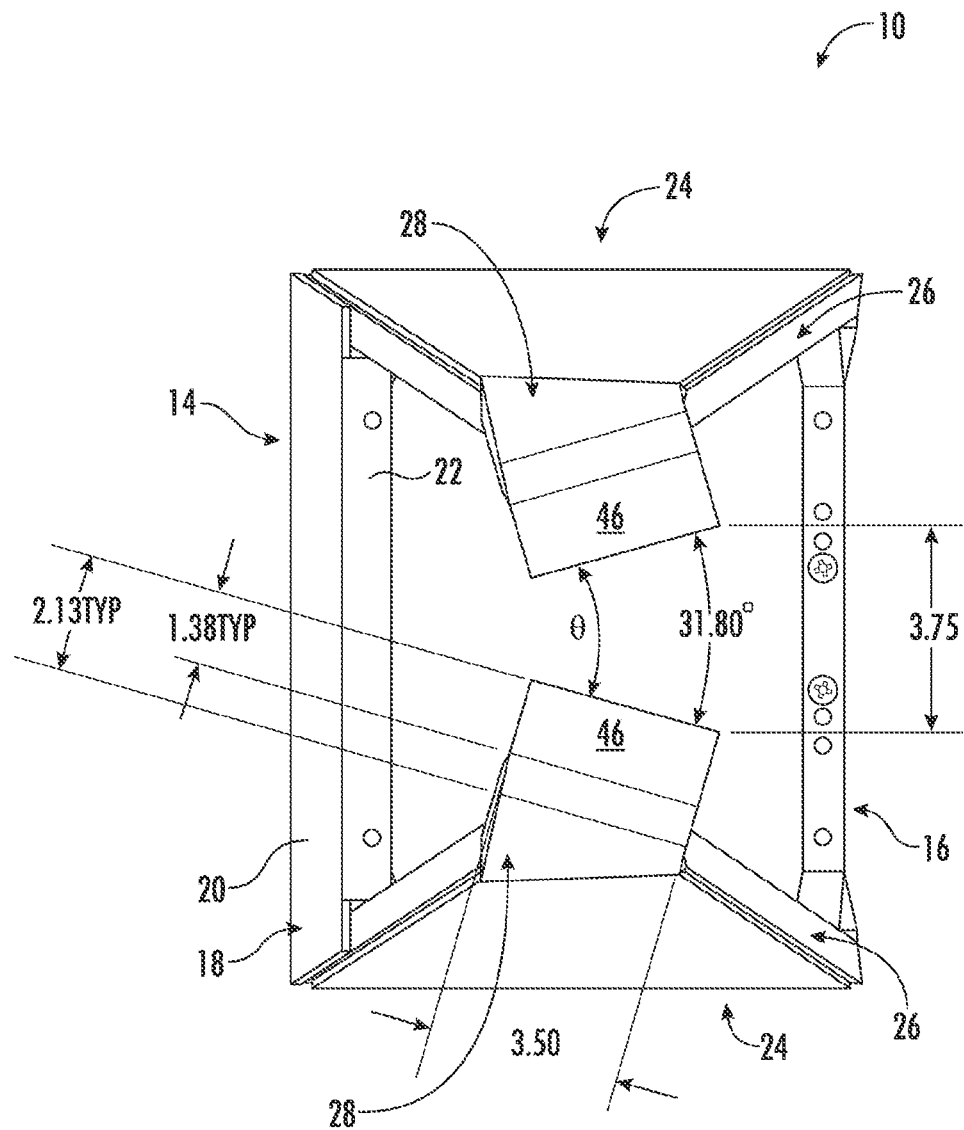
FIG. 3 is a top view of the support stand depicted in FIG. 1.

According to one embodiment, the support stand 10 is sized and configured to engage with one of the chain stays 60 on the bicycle frame 52. In this regard, the flanges 46 on the support stand 10 may be sized to receive the chain stay 60 to support the bicycle 50 with the rear wheel 64 elevated off the ground. On most bicycles 50, the chain stays 60 have a rear end positioned near the rear axle 68, and a front end positioned near the spindle 70. The chain stays 60 may be angled relative to each other, such that the chain stays 60 spread apart as they extend from the spindle 70 toward the rear axle 68. Thus, due to the angled configuration of the chain stays 60 on the bicycle frame 52, the flanges 46 may also be angled in a complementary manner to accommodate the configuration of the chain stays 60. As shown in FIG. 3, the front ends of the flanges 46 are separated by a first distance, and the rear ends of the flanges 46 are separated by a second distance greater than the first distance. Furthermore, each flange 46 may define an inner edge, with the inner edges being defining an angle Θ therebetween. The angle Θ may vary from 15 degrees to 45 degrees, and in one particular embodiment the angle Θ may be equal to approximately 31.80 degrees. Those of ordinary skill in the art will recognize that those surfaces of the flanges 46 coming into contact with respective ones of the chain stays 60 may each have some form of pad, protective layer, or protective coating applied thereto as is adapted to prevent any scratching or other damage to the chain stays 60.

According to one implementation of the support stand 10, the upper body 28 may include a contoured configuration to allow for the angled configuration of the flanges 46. In this regard, the upper bodies 28 may define a twisted configuration, wherein the front faces 38 of the upper bodies 28 are closer together than the rear faces 40 at the upper end portions 44 of the upper bodies 28. The twisted configuration may produce an outer surface on each upper body 28 having a convex lower segment and a concave upper segment, and an inner surface having a concave lower segment and a convex upper segment.

The support stand 10 may additionally include a pair of wheel guide posts 72 coupled to the rear member. Each wheel guide post 72 may be insertable within a bore or opening 74 formed within the rear member 16. Along these lines, the rear member 16 may include several bores or openings 74 formed therein to accommodate wheels that are different widths, and the wheel guide posts 72 may be selectively inserted into a pair of bores or openings 74 that are spaced apart by a distance that is slightly greater than the width of the rear wheel. The wheel guide posts 72 may provide stability to the wheel 64 and prevent excessive wobbling thereof, as may occur when the cranks are rotated during maintenance testing of the vehicle.

With the basic structure of the support stand 10 provided above, the following discussion relates to an exemplary use of the support stand 10. To use the support stand 10 the wheel guide posts 72 may be adjusted to accommodate the size of the wheel/tire 64 on the bicycle 50. The bicycle 50 is then moved adjacent the support stand 10. The rear portion of the bicycle frame 52 is lifted and the rear wheel 64 is aligned with the wheel channel and the guide posts 72. The frame 52 is then lowered until the chain stays 60 are resting on top of respective flanges 46. When the chain stays 60 are on the flanges 46, a portion of the weight of the bicycle 50 may be transferred to the support stand 10. In this regard, the bicycle 50 may be supported in an upright configuration, with the front wheel 66 on ground, and the rear wheel 64 elevated off the ground, and the rotation axes of the front and rear wheels 66, 64 being generally horizontal, or parallel to the ground.

The chain stays 60 may remain on the flanges 46 during maintenance or testing of the bicycle 50, during periods of non-use of the bicycle 50, or to display the bicycle 50. With regard to displaying the bicycle 50, the ability of the support stand 10 to support the bicycle 50 in a generally vertical orientation may differ from the generally tilted configuration that bicycles typically assume when supported by a conventional kickstand. Thus, the support stand 10 may present the bicycle 50 to the viewer in the same generally vertical orientation as that of when a rider is riding the bicycle 50.

To remove the bicycle 50 from the support stand 10, the rear portion of the frame 52 is lifted and is moved out of alignment with the wheel channel of the support stand 10. In this regard, the bicycle 50 may be moved to the side of the support stand 10, or the support stand 10 may be moved away from the bicycle 50 while the rear portion of the bicycle frame 52 is lifted. Thus, by simply raising or lowering the rear portion of the bicycle frame 52, the bicycle 50 may be lifted away from, or lowered onto, the support stand 10.

Any dimensions mentioned herein or included in the drawings are exemplary in nature, and thus, do not limit the scope of the present disclosure. In this regard, it is contemplated that the support stand 10 may be formed in other sizes and other configurations having different dimensional properties. Furthermore, it is understood that any dimension may be associated with industry standard manufacturing tolerances.

Referring now to FIGS. 5-8, there is depicted a second embodiment of a support stand 100 having adjustable support flanges 102 (e.g., capable of adjusting the height of the support flange 102). The support stand 100 shown in FIGS. 5-8 is similar to the support stand 10 depicted in FIGS. 1-4 and described above. Accordingly, the following discussion will focus on those portions of the support stand 100 that are unique relative to the above-described embodiment.

The support stand 100 generally includes a base 104 and a pair of lateral supports 106 extending upwardly from the base 104. The base 104 may include a flanged structure including a forward-base body 108, a rearward-base body 110, and a pair of side-base bodies 112. Each base body 108, 110, 112 may have a width as the distance between opposed edges, and a height as the distance between an upper surface and a lower surface. The width may be greater than the height to enhance the overall stability of the support stand 100. The rearward-base body 110 may include several apertures 114 formed therein to receive a pair of guide posts 116 which stabilize a rear bicycle wheel when the bicycle is supported by the stand. The exemplary support stand 100 includes two pairs of apertures 114 (e.g., an inner pair and an outer pair), each being sized to support a wheel having a different width. However, it is contemplated that the support stand 100 may include three pairs of apertures 114 (e.g., an inner pair, an intermediate pair, and an outer pair), or more pairs of apertures, to allow for greater width adjustment, without departing from the spirit and scope of the present disclosure. Each guide post 116 may include a main portion 118 and a support fin 120 extending outwardly from the main portion 118 to provide lateral stability to the main portion 118 during use. The rearward-base body 110 may include a channel formed therein which is complementary in shape to that of the support fin 120 to receive and stabilize the support fin 102 during use.

Each lateral support 106 may extend upwardly from a respective side-base body 112 and include a lower body 122 and an upper body 124. The upper body 124 may include a main wall 126, and a pair of side walls 128 extending from the main wall 126 in opposed relation to each other. The main wall 126 may be generally planar and include an outer face and an inner face. Each exemplary main wall 126 may also include a plurality of openings 130 formed therein, with each opening 130 extending through the outer and inner faces. Each opening 130 may also be centered within a recess, which forms a concave surface, and extends inwardly from the outer face.

The side walls 128 may be positioned on opposite ends of the main wall 126, such that one of the side walls 128 may define a front face of the upper body 124, while the other side wall 128 may define a rear face of the upper body 124. Each side wall 128 may include a flange 132 extending generally parallel to the main wall 126 toward the opposing flange 132 (e.g., the flanges 132 may extend toward each other).

The main wall 126 and the pair of side walls 128 (including the flanges 132) may collectively define a channel that may selectively receive an insert 134 including a main wall 136 and the support flange 102 extending from the main wall 136. In the embodiment discussed above, the support flange may be integrated into the upper body, whereas in the embodiment depicted in FIGS. 5-8, the support flange 102 may be detachable and adjustable relative to the upper body 124. The main wall 136 and support flange 102 of the insert 134 may be formed from plastic, metal, or other materials known in the art.

The insert 136 may include a locking member, e.g., a spring-biased detent, that may be extendable through one of the openings 130 formed in the main wall 126 of the upper body 124 to allow for selective height adjustment of the support flange 102 relative to the upper body 124. In this regard, it is contemplated that the support stand 100 may be used with different sized bicycles, and that by allow for such height adjustment, the support stand 100 may be more universal in nature and provide greater flexibility for use with different sized bicycles. The spring-biased detent may include a detent body that is operatively engaged with a spring, that is located with a spring housing coupled to the main wall 136 of the insert 134.

Figure 8:
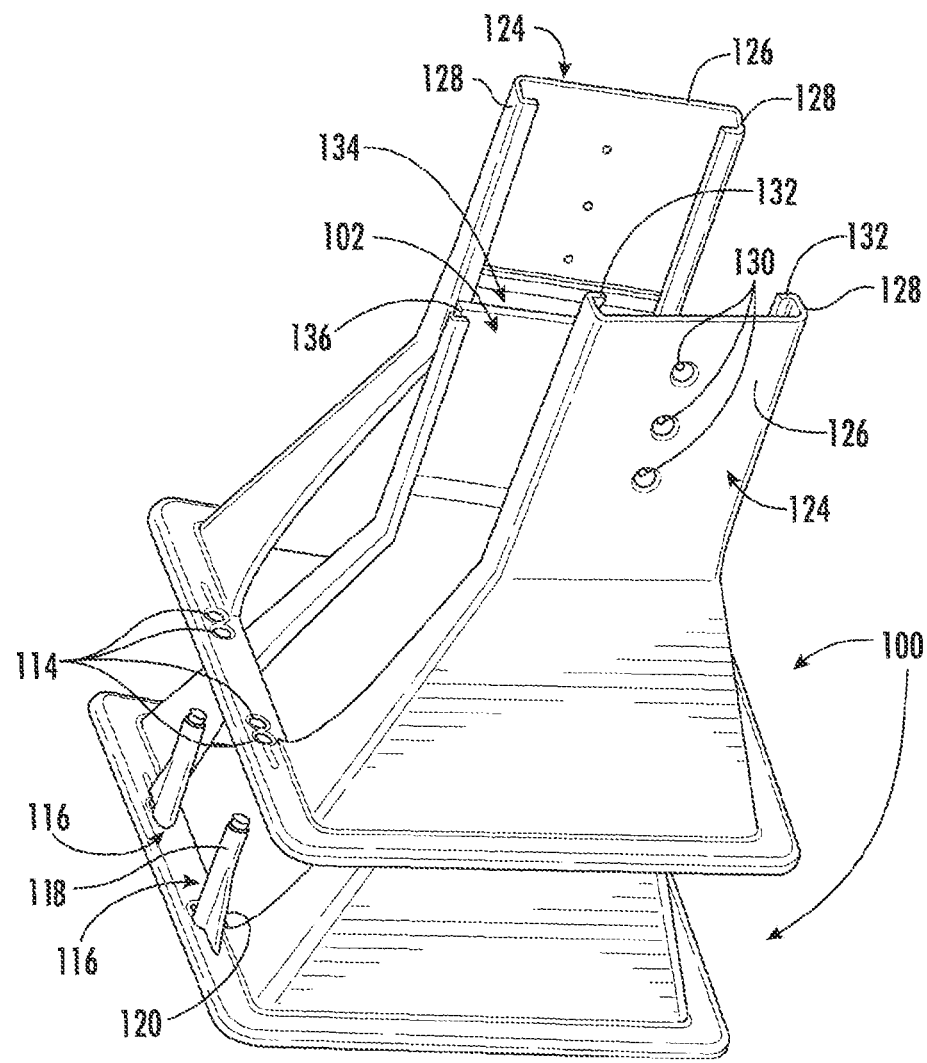
FIG. 8 is an upper perspective view of a pair of support stands in a stacked configuration.

Referring now specifically to FIG. 8, the support stand 100 may be configured to allow for stacking of multiple support stands 100 on top of each other. In particular, the lower body 122 of one support stand 100 may be placed on top of another support stand 100, with the upper body 124 of the bottom support stand 100 extending into the lower body 122 of the top support stand 100. The complementary configuration of the support stands 100 allows the support stands 100 to assume a nested, stacked configuration, which may be preferable for storage or non-use of the support stands 100.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A support stand for supporting a bicycle having a bicycle frame and a rear wheel, the support stand comprising:
   a base;
   a pair of lateral support members extending upwardly from the base in opposed relation to each other to define a wheel receiving channel therebetween, the wheel receiving channel extending along a channel axis, each lateral support member including a pair of side segments extending from the base in spaced relation to each other, with the pair of side segments extending from the base in a manner such that the pair of side segments converge toward each other as they extend away from the base; and
   a pair of flanges extending from respective ones of the pair of lateral support members, wherein the pair of flanges each define a distal edge positioned away from the corresponding lateral support member, the distal edges being arranged in a non-parallel relation to each other, the pair of flanges being arranged so as to be engageable with respective opposed portions of the bicycle frame to support the bicycle frame with the rear wheel off the ground and the rear wheel adapted to be received within the wheel receiving channel.

2. The support stand recited in claim 1, wherein the pair of flanges are integrally connected to respective ones of the pair of lateral support members.

3. The support stand of claim 1 wherein:
   each of the lateral support members defines a lateral channel therein; and
   each of the flanges is formed on a respective one of a pair of support bodies configured to be received within a respective lateral channel, each of the support bodies including a main wall, with a corresponding one of the flanges extending from the main wall.

4. The support stand recited in claim 3, wherein each support body includes a locking member selectively engageable with a respective one of the pair of lateral support members to lock the support body relative to the respective one of the pair of lateral support members.

5. The support stand recited in claim 4, wherein each of the lateral support members includes a plurality of openings formed therein, each opening being configured to receive the locking member when the corresponding support body is in a prescribed position.

6. The support stand recited in claim 1, wherein each lateral support member includes a trapezoidal lower body and an upper body extending from the trapezoidal lower body, wherein the trapezoidal lower body is at least partially defined by the pair of side segments.

7. The support stand recited in claim 6, wherein each upper body includes an outer surface having a convex segment and a concave segment.

8. The support stand recited in claim 6, wherein each trapezoidal lower body is angled toward the corresponding trapezoidal lower body of the other lateral support member as the trapezoidal lower bodies extend away from the base.

9. The support stand recited in claim 1, wherein each lateral support member includes an inner surface facing the wheel receiving channel, and an outer surface opposite the inner surface, each flange extending from a respective inner surface.

10. The support stand recited in claim 1, wherein the pair of flanges extend from respective ones of the pair of lateral support members toward each other.

11. The support stand recited in claim 1, wherein the base includes a pair of rods arranged in spaced relation to each other.

12. The support stand recited in claim 11, wherein each lateral support member extends between the pair of rods.

13. The support stand recited in claim 1, wherein each lateral support member includes an uppermost surface positioned away from the base, each flange being spaced from the uppermost surface on the lateral support member from which each flange extends.

14. The support stand recited in claim 1, wherein each lateral support member includes a front face and a rear face, each flange extending between the front face and the rear face of the corresponding lateral support member.

15. The support stand recited in claim 14, wherein each flange extends entirely between the front face and the rear face of the corresponding lateral support member.

16. The support stand recited in claim 1, further comprising a pair of wheel guide posts selectively engageable with the base by a distance capable of providing stability to a wheel of a bicycle supported by the support stand.

17. The support stand recited in claim 16, wherein the base includes at least three openings, each opening being adapted to receive a respective one of the pair of wheel guide posts.

18. The support stand recited in claim 1, wherein the distal edges define an angle between 15-45 degrees.

* * * * *